Jan. 22, 1957 R. W. LA BERGE ET AL 2,778,745
PROCESS OF APPLYING ADHERENT AMIDE CONTAINING COATINGS
TO A WOOD BASE AND ARTICLE PRODUCED THEREBY
Filed March 21, 1952
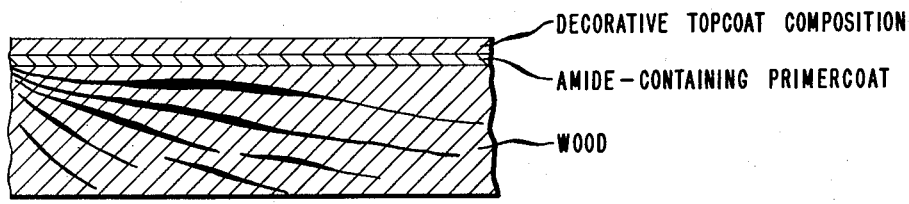
INVENTORS
ROBERT WILLIAM LA BERGE
CLYDE GEORGE MURPHY
BY Ernest N. Beck
ATTORNEY

United States Patent Office 2,778,745
Patented Jan. 22, 1957

2,778,745

PROCESS OF APPLYING ADHERENT AMIDE CONTAINING COATINGS TO A WOOD BASE AND ARTICLE PRODUCED THEREBY

Robert William La Berge, Philadelphia, and Clyde George Murphy, Springfield, Pa., assignors to E. I. du Pont de Nemours & Company, Wilmington, Del., a corporation of Delaware Application March 21, 1952, Serial No. 277,906

5 Claims. (Cl. 117—72)

This invention relates to the improvement of adhesion of organic coating compositions and more particularly it relates to the improvement of adhesion of polymeric coating compositions to cellulosic substrates and to the improvement of intercoat adhesion between organic film-forming materials.

An important requirement of coating compositions is the ability to adhere to the substrate. Generally the utility of the product depends on the adhesion characteristics in reference to the substrate and the ability of one strata of coating composition to coalesce with another strata of coating composition to form either a congruous or substantially homogeneous film.

Numerous steps have been taken toward improving the adhesion of organic coating compositions. A common practice is to abrade the substrate and the undercoats by sanding and other means. Sanding is laborious and does not in all cases significantly improve adhesion. Furthermore, care must be exercised that the consequences of abrading do not appear as sand scratches in the top coats. Another means used to promote adhesion of coating compositions is to mildly attack the finish with an active solvent. U. S. Patent No. 2,168,024 embraces representative mild reacting solvent mixtures which may be used for this purpose. Still other means resort to more drastic treatment of the substrate with corrosive chemicals. This latter practice is more common in the metal industries where the metal is conditioned by chemical reaction with solutions of phosphoric acid, chromic acid and the like.

This invention is primarily concerned with adhesion of organic films to cellulosic substrates, more specifically wood. Due to the physical structure of wood, many coating compositions adhere satisfactorily to this type of substrate. However, some synthetic organic polymer compositions apparently do not adequately wet the surface of the wood and consequently do not exhibit the desired degree of adhesion and often fail in intercoat adhesion.

An object of this invention is to overcome the adhesion deficiency of wood finishing systems and to promote improved adhesion of organic coating compositions to wood. More broadly, it is an object to enhance the adhesion between a cellulosic substrate and organic coating compositions. A further object is to improve the intercoat adhesion between polymeric organic coating compositions, particularly in multiple coat systems where the individual coats are comprised of dissimilar organic film-forming materials.

These objects are accomplished by the addition to the finishing system of an adhesion-promoting agent which is an amide characterized by the chemical structure $$R_1-\overset{O}{\overset{\|}{C}}-\underset{\underset{R_3}{|}}{N}-R_2$$

where $R_1$ is hydrogen or methyl, $R_2$ is hydrogen, methyl or ethyl and $R_3$ is a radical selected from the group consisting of hydrogen, aliphatic hydrocarbon radicals having 1 to 12 carbon atoms, allyl and 2-cyanoethyl. In the preferred embodiment of the invention an N,N-substituted formamide, particularly dimethyl formamide, is incorporated in the coating composition to promote adhesion.

An illustrative embodiment of the coated articles of the invention is represented by the drawing in an enlarged cross-sectional view.

No particular theory is advanced to explain the peculiar behavior of formamide and derivatives thereof having N-substituents in enhancing the adhesion of polymeric compositions to cellulosic substrates, but these adhesion promoting agents appear to have a strong affinity for the cellulose fiber structures, wet the fibers and cause them to swell. By swelling the fibers, opportunity is provided for the coating compositions to penetrate the interstices of the structure, the amide agent serving also as a solvent carrier for the organic film-forming material. Through substantial volatile loss of the agent, the swollen cellulose fibers attempt to retract to substantially their original unswollen state, thereby entrapping or adhesively binding the coating composition in the cellulose structure.

The following examples are illustrative of finishing systems wherein the adhesion characteristics are significantly enhanced as a result of the presence of a nitrogen substituted amide.

Example I

A representative furniture sealer composition which exhibits deficiencies characteristic of lacquer sealers is as follows:

| | Parts by weight |
|---|---|
| Cellulose nitrate | 11.7 |
| Blown castor oil | 6.4 |
| Dibutyl phthalate | 0.6 |
| Zinc stearate sanding aid | 1.3 |
| Lacquer solvent | 22.9 |
| Alcoholic diluents | 19.5 |
| Hydrocarbon diluents | 37.6 |
| | 100.0 |

In reducing this composition to spraying consistency, 90 parts of sealer, 10 parts of dimethyl formamide and a sufficient amount of orthodox lacquer thinner were combined to give the desired viscosity.

A urea-formaldehyde/alkyd resin composition used as a top coat finish is as follows:

| | Parts by weight |
|---|---|
| Butylated urea-formaldehyde resin | 19.3 |
| Castor oil-modified alkyd resin | 11.2 |
| Maleic anhydride modified alkyd resin | 9.9 |
| Blown castor oil | 1.6 |
| Butyl alcohol | 27.4 |
| Isopropyl alcohol | 4.3 |
| High solvency petroleum naphtha | 24.3 |
| Ethyl acetate | 2.0 |
| | 100.0 |

This synthetic resin composition in the ratio of 90 parts and 10 parts of dimethyl formamide was reduced with a mixture of high-solvency petroleum naphtha and butyl alcohol to spraying viscosity.

The aforementioned sealer containing dimethyl formamide was applied to mahogany panels and top-coated with the urea-formaldehyde resin finish from which the dimethyl formamide was omitted. The dried finish was found to have an adhesion rating of 4.39 kilograms using as the measuring means a modification of the Zuhr scratch adhesion and mar resistance tester developed in its original form in the Bell Telephone Laboratories. This testing machine provides a means of measuring the scratch adhesion or film-adherence in terms of the minimum load in grams required to cause removal of the film, the load being applied to a stylus in contact with the film. The unmodified Zuhr Tester and its operation are described in detail in the August 1945 issue of Bell Laboratories Record. The stylus of the orthodox machine consists of a highly polished chromium plated rod of 0.0625 inch drill stock bent in the shape of a U having an outside diameter of 0.256 inch. For measurement of the adhesion results obtained in this invention, the orthodox U-shaped stylus was replaced with a solid bar stylus designed to measure a higher degree of adhesion for a given load and being capable of withstanding greater loads. The modified stylus was formed from .250 inch square Rex' AAA tool steel with the planes of the two faces defining the stylus tip being displaced 20° and 60° respectively from the vertical plane corresponding with the shank, said stylus having an effective edge defined by a radius of .125 inch. This modified stylus yields more /consistent scratch resistance results which are approximately one-fourth the value of those determined with the standard U-shaped stylus. For example, a 5 kilogram value with the modified stylus is equivalent to about 20 kilograms measured with the standard Zuhr stylus.

A similar panel prepared by undercoating with the sealer composition free of dimethyl formamide, but top-coated with the urea-formaldehyde resin finish containing dimethyl formamide was found to have an adhesion rating of 4.64 kilograms. A control system from which dimethyl formamide was omitted from both the sealer and the top coat exhibited an adhesion rating of 2.38 kilograms. These results show that the adhesion rating was improved by 85% or more over that of the conventional system.

*Example II*

In another finishing system using the same sealer in combination with a urea-formaldehyde resin/styrenated dehydrated castor oil alkyd resin top coat the adhesion rating was 4.32 kilograms when 10% of dimethyl formamide was included in the sealer, 4.40 kilograms when the dimethyl formamide was incorporated in the top coat and 2.93 kilograms when the dimethyl formamide was omitted. In this system the improvement was calculated to be at least 58%.

The same finishing system was repeated using other concentrations of dimethyl formamide in the sealer to ascertain the effect of lower concentrations. The presence of as little as 2% reflected significant improvement in adhesion, that is, 35% or more. Other concentrations show a proportional effect, but the practical range is from 2 to 10% dimethyl formamide.

*Example III*

Penetrating primers such as claimed in U. S. Patent No. 2,293,558 comprised of up to 42 parts shellac and at least 58 parts of polyvinyl butyral resin and cellulose nitrate in the proportion between 65 parts of vinyl resin and 35 parts cellulose nitrate and 25 parts vinyl resin and 75 parts of cellulose nitrate are recognized for their superior adhesion characteristics. When the urea-formaldehyde resin/styrenated alkyd resin finish of Example II was applied over such a primer, the adhesion rating was observed to be 5.00 kilograms. When dimethyl formamide was included in the top coat composition, adhesion increased to 5.22 kilograms. Similarly, when the top coat composition of Example I with and without dimethyl formamide was applied over this type of primer, the adhesion improved from the control value of 4.43 kilograms to 4.74 kilograms. Although the improvement was small, the increase in adhesion demonstrates that dimethyl formamide is effective with coating compositions which are already recognized as superior in adhesion. Comparison of the results obtained in Examples I, II and III demonstrated that finishing systems normally recognized as weak in adhesion are improved to the adhesion level of systems considered superior.

*Example IV*

It is not necessary that the adhesion promoting agent be incorporated in the coating composition. The series of experiments recorded below shows that the agent may be used as a primer directly on the wood and the top coat applied over the wet or damp wood surface. The following conventional furniture lacquer composition was applied over a number of amide agents to determine their effectiveness in promoting improved adhesion:

| | Parts by wt. |
|---|---|
| Cellulose nitrate | 11.1 |
| Cocoanut oil-modified alkyd resin | 8.7 |
| Maleic anhydride modified ester gum | 1.0 |
| Blown castor oil | 5.4 |
| Conventional lacquer solvents and diluents | 73.8 |
| | 100.0 |

| Agent: | Adhesion, kilograms |
|---|---|
| None | 4.65 |
| Formamide | 8.94 |
| N-methyl formamide | 8.75 |
| N,N-dimethyl formamide | 9.30 |
| N,N-diethyl formamide | 9.23 |
| N,N-allyl methyl formamide | 10.00+ |
| N,N-dimethyl acetamide | 8.88 |

*Example V*

The same series of priming agents were evaluated under a synthetic resin finish consisting of a copolymer of styrene and acrylonitrile in which the two components are in the ratio of 80 parts styrene and 20 parts acrylonitrile. The copolymer was applied from a solution of 20% in toluene.

| Agent: | Adhesion, kilograms |
|---|---|
| None | 2.02 |
| N,N-methyl formamide | 6.41 |
| N,N-dimethyl formamide | 10.00+ |
| N,N-diethyl formamide | 6.49 |
| N,N-allyl methyl formamide | 7.48 |
| N,N-dimethyl acetamide | 6.24 |
| N-2-cyanoethyl methyl formamide | 3.22 |

*Example VI*

These adhesion promoting amide agents are also effective with polymerizable coating compositions applied in the monomeric form and polymerized on the surface. Representative materials of this type are the dimethacrylate esters of the polyethylene glycols. This finish applied directly to a maple panel exhibited an adhesion value of 4.64 kilograms. The value was increased to 6.62 kilograms when the wood was primed with N,N-dimethyl formamide. When the monomer composition was reduced 10% with dimethyl formamide, the adhesion value was 5.89 kilograms. 30% reduction with dimethyl formamide reflected a value of 6.76 kilograms.

These amide agents have been found to improve the adhesion of orthodox paint and varnish finishes to wood and to enhance the intercoat adhesion. A particularly noteworthy observation was that paint containing N,N-dimethyl formamide used to repaint surfaces washed with soapy water exhibited adhesion superior to that of the paint which did not contain the amide.

The foregoing examples were directed to the improvement of adhesion of a variety of organic coating compositions applied to wood. Similar adhesion improvement is reflected in applying coating compositions and resinous adhesives to paper, regenerated cellulose, cellulose fiber structures and cellulosic substrates in general.

Results have shown that formamide and nitrogen substituted derivatives of formamide and acetamide are effective agents in enhancing the adhesion of organic film-forming materials to cellulosic substrates, particularly wood. These agents also improve intercoat adhesion, particularly in finishing systems where the individual coats of the heterogeneous system differ significantly in chemical composition.

Not all amides are effective agents for promoting adhesion. To be useful, the amide should be substantially volatile under the processing conditions associated with the application of the coating to the cellulosic substrate. However, the rate of volatile loss should be sufficiently slow to permit an ample period of contact between the amide and the substrate to enable the agent to exert its adhesion-promoting activity. For this purpose these amides should be liquid at the temperature of the coating material which is usually at room temperature of about 15° to 35° C. and should have a boiling point between 100° C. to 225° C. to assure proper volatilization. It will be apparent that application of coating compositions under high temperature conditions, such as hot spray application and high temperature force drying and baking will tolerate amides with higher boiling points. The amide should either be a solvent for the organic film-former or have a solubilizing effect on the film-former. The amides of lesser volatility should have a tolerable plasticizing action on the film-former. Amides having the empirical formula:

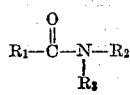

where R₁ represents a member of the group consisting of hydrogen and methyl radical, R₂ represents a member of the group consisting of hydrogen, methyl and ethyl radical and R₃ represents a member of the group consisting of hydrogen, saturated aliphatic hydrocarbon radicals preferably having 1 to 4 carbon atoms inclusive, allyl radical and 2-cyanoethyl radical have been found to be effective agents. Under some conditions R₂ or R₃ may include saturated aliphatic radicals having up to 12 carbon atoms, but the higher ones are useful only for special applications where the plasticizing effect of the amide can be tolerated. Although the use of amides wherein R₃ is a saturated aliphatic hydrocarbon radical having more than 12 carbon atoms registers an improvement in adhesion, their use is undesirable because effective concentrations produce excessive plasticization. The preferred and most effective species are the low molecular weight, nitrogen substituted formamides, particularly N,N-dimethyl formamide, N,N-diethyl formamide, N,N-allyl methyl formamide and N,N-2-cyanoethyl methyl formamide. Concentrations as low as 0.5% of agent register improvement in adhesion, but a concentration of 2% in the coating composition is generally required to accomplish a practical improvement. In some coating compositions, concentrations higher than 10% of the amide show proportionately greater improvement in adhesion, but, in general, the effectiveness levels off at about 10% concentration. For optimum results, a concentration in the range of 5 to 10% is preferred.

The adhesion promoting agents are effective with a wide classification of organic coating compositions based on film-formers such as cellulose nitrate, organic esters of cellulose, ethyl cellulose, acrylic resins, vinyl ester polymers, polyvinyl acetal resins, urea-formaldehyde resins, melamine formaldehyde resins, phenolic resins, alkyd resins, ester gum, shellac, drying oils, styrene/acrylonitrile copolymers, acrylonitrile/butyl acrylate copolymers, polyether resins, allylglycidyl ether copolymers, polyamide resins and other homopolymers and copolymers which have been found useful in the coating and adhesive fields of application. The amide agents are effective with these film-forming materials when they are compatible therewith and preferably are solvents for the film-former. Some compositions contain acidic curing agents which may promote hydrolysis of the amide and with such combinations it is desirable that temperatures substantially above atmospheric temperature be avoided until after the composition has been in effective contact with the wood or cellulosic substrate. The use of the amide agent as a primer on the substrate obviates this precaution.

The effects of the use of the amide agents are more manifest in coating compositions applied to wood, but organic film-forming compositions containing N,N-dimethyl formamide and other adhesion promoting amides may be effectively applied to metallic substrates where it is desirable to improve intercoat adhesion. These adhesion promoting agents have utility in the coating field in general, regardless of the substrate because of the beneficial effect on intercoat adhesion.

The agent is effective when applied either as a primer, as a component of the undercoat composition or as part of the top coat composition. Each method of introducing the agent has merit, but it is generally preferred that the amide be used in the coating composition whether it be the undercoat or top coat. In the furniture finishing system, the sealer preferably contains the amide since sealers are the recognized weak link in the coating system. Introduced in this manner, the agent penetrates through the filler, wash coat and stain to the wood to enhance adhesion and renders improvement in adhesion between the sealer and the top coats which may be either similar or dissimilar in composition.

The use of these agents has provided a distinct advance in the art of finishing wood by overcoming adhesion deficiencies of the coating system without adversely affecting other properties. Wood finishing in consequence of this invention is opened up as a field of use for many film-formers which normaly are considered deficient in adhesion direct to wood and in intercoat adhesion to dissimilar finishing substrates.

It is apparent that this invention may be extended beyond the application to the wood-finishing field and that many widely different embodiments of the present invention can be made without departing from the spirit and scope thereof, and it is not intended to be limited except as indicated in the appended claims.

We claim:

1. As a new article of manufacture, a wood base having an adherent film thereon of a coating composition comprising an organic film-forming material, plasticizer and a liquid aliphatic amide boiling between 100° and 225° C., said amide having the formula:

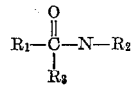

in which R₁ is selected from the class consisting of hydrogen and the methyl group, R₂ is selected from the class consisting of hydrogen, methyl and ethyl groups and R₃ is selected from the class consisting of saturated aliphatic hydrocarbon radicals having from 1 to 12 atoms inclusive, the allyl group and the 2-cyanoethyl group.

2. A new article of manufacture comprising a wood base, a priming coat and a top decorative coat superposed on the said priming coat, one of these coats comprising an organic film-forming agent, plasticizer therefor and a liquid aliphatic amide boiling between 100° and 225° C., said amide having the formula:

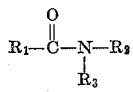

in which R₁ is selected from the class consisting of hydrogen and the methyl group, R₂ is selected from the class consisting of hydrogen, methyl and ethyl groups and R₃ is selected from the class consisting of saturated aliphatic hydrocarbon radicals having from 1 to 12 atoms inclusive, the allyl group and the 2-cyanoethyl group.

3. The process of increasing the adhesion of a coating composition comprising an organic film-forming agent, plasticizer and a volatile solvent to a wood base which comprises adding to the said composition from 0.5% to 10% based on the non-volatile, film-forming content of the said composition of a liquid amide boiling between 100° C. and 225° C. having the following formula:

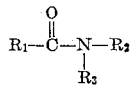

in which $R_1$ is selected from the class consisting of hydrogen and the methyl group, $R_2$ is selected from the class consisting of hydrogen, methyl and ethyl groups and $R_3$ is selected from the class consisting of saturated aliphatic hydrocarbon radicals having from 1 to 12 atoms inclusive, the allyl group and the 2-cyanoethyl group.

4. In the process of increasing the adhesion of a coating composition to a wood base, the improvement which comprises first applying a priming composition comprising an organic film-forming material, plasticizer, a volatile solvent and a liquid aliphatic amide boiling between 100° C. and 225° C. to the cellulosic base and thereafter applying an organic coating composition, said amide having the formula:

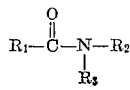

in which $R_1$ is selected from the class consisting of hydrogen and the methyl group, $R_2$ is selected from the class consisting of hydrogen, methyl and ethyl groups and $R_3$ is selected from the class consisting of saturated aliphatic hydrocarbon radicals having from 1 to 12 atoms inclusive, the allyl group and the 2-cyanoethyl group.

5. In the process of increasing the adhesion of a coating composition to a wood base, the improvement which comprises first applying a priming composition consisting essentially of a liquid aliphatic amide boiling between 100° C. and 225° C. to the wood base, and thereafter applying a coating composition comprising an organic film-forming material, plasticizer and a volatile solvent, said amide having the formula:

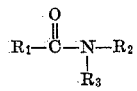

in which $R_1$ is selected from the class consisting of hydrogen and the methyl group, $R_2$ is selected from the class consisting of hydrogen, methyl and ethyl groups and $R_3$ is selected from the class consisting of saturated aliphatic hydrocarbon radicals having from 1 to 12 atoms inclusive, the allyl group and the 2-cyanoethyl group.

References Cited in the file of this patent

UNITED STATES PATENTS

| | | |
|---|---|---|
| 2,047,919 | Magil | July 14, 1936 |
| 2,160,458 | Gladding | May 30, 1939 |
| 2,356,290 | Wendler | Aug. 22, 1944 |
| 2,461,472 | Kaszuba | Feb. 8, 1949 |
| 2,461,473 | Kaszuba | Feb. 8, 1949 |
| 2,468,920 | Brown | May 3, 1949 |
| 2,502,030 | Scheiderbauer | Mar. 28, 1950 |
| 2,579,483 | Fenn | Dec. 25, 1951 |
| 2,597,864 | Greubel | May 27, 1952 |
| 2,689,236 | Webb | Sept. 14, 1954 |

FOREIGN PATENTS

| | | |
|---|---|---|
| 98,031 | Australia | Sept. 25, 1924 |
| 477,024 | Canada | Sept. 18, 1951 |